United States Patent
Malks et al.

(10) Patent No.: US 8,397,056 B1
(45) Date of Patent: Mar. 12, 2013

(54) METHOD AND APPARATUS TO APPLY AN ATTRIBUTE BASED DYNAMIC POLICY FOR MASHUP RESOURCES

(75) Inventors: Daniel Malks, Arlington, VA (US); Aleksey Polenur, Owings Mills, MD (US); Karthic Thope, Fairfax, VA (US)

(73) Assignee: JackBe Corporation, Chevy Chase, MD (US)

( * ) Notice: Subject to any disclaimer, the term of this patent is extended or adjusted under 35 U.S.C. 154(b) by 263 days.

(21) Appl. No.: 12/763,582

(22) Filed: Apr. 20, 2010

Related U.S. Application Data (60) Provisional application No. 61/171,376, filed on Apr. 21, 2009.

(51) Int. Cl.
    *H04L 29/06* (2006.01)
(52) U.S. Cl. ............ 713/151; 726/28; 726/30; 709/203; 709/225; 709/229
(58) Field of Classification Search .................... 726/28, 726/30; 713/151
    See application file for complete search history.

(56) References Cited

U.S. PATENT DOCUMENTS

| | | | |
|---|---|---|---|
| 4,914,586 A | 4/1990 | Swinehart et al. | |
| 6,119,135 A | 9/2000 | Helfman | |
| 6,674,447 B1 | 1/2004 | Chiang et al. | |
| 6,684,207 B1 | 1/2004 | Greenfield et al. | |
| 6,760,306 B1 | 7/2004 | Pan et al. | |
| 7,149,982 B1 | 12/2006 | Duperrouzel et al. | |
| 7,434,229 B2 | 10/2008 | Barinov et al. | |
| 7,536,413 B1 | 5/2009 | Mohan et al. | |
| 7,788,251 B2 | 8/2010 | Carlson et al. | |
| 7,831,559 B1 | 11/2010 | Mohan et al. | |
| 7,904,818 B2 | 3/2011 | Lauridsen et al. | |
| 8,321,792 B1 | 11/2012 | Alur et al. | |
| 2001/0028368 A1 | 10/2001 | Swartz et al. | |
| 2002/0178119 A1* | 11/2002 | Griffin et al. | ............ 705/54 |
| 2003/0117437 A1 | 6/2003 | Cook et al. | |
| 2003/0197726 A1 | 10/2003 | Weitzman | |
| 2004/0183831 A1 | 9/2004 | Ritchy et al. | |
| 2004/0207659 A1 | 10/2004 | Goodman et al. | |
| 2004/0221296 A1 | 11/2004 | Ogielski et al. | |
| 2005/0166180 A1 | 7/2005 | Lemon et al. | |
| 2005/0278323 A1 | 12/2005 | Horvitz et al. | |
| 2007/0067722 A1 | 3/2007 | Ames et al. | |
| 2007/0112955 A1 | 5/2007 | Clemm et al. | |
| 2007/0130541 A1 | 6/2007 | Louch et al. | |
| 2007/0162850 A1 | 7/2007 | Adler et al. | |

(Continued)

OTHER PUBLICATIONS

Magazinius et al., "A Lattice-based Approach to Mashup Security", Apr. 2012, pp. 15-23.*

(Continued)

*Primary Examiner* — Taghi Arani
*Assistant Examiner* — Thaddeus Plecha
(74) *Attorney, Agent, or Firm* — Posz Law Group, PLC (57) ABSTRACT

A computer system includes a mashup section that provides a mashup that performs an action on a resource. An attribute identification section identifies an attribute of a user running the mashup. An access control section provides access control. The mashup is associated to a permission artifact. The permission artifact specifies a principal and whether to permit the principal to take the action on the resource. The access control is triggered only when the mashup attempts to perform the action on the resource, and checks whether the attribute of the user running the mashup is predefined as belonging to the principal specified in the permission artifact associated to the mashup, and then permits the action on the resource only when the attribute belongs to the principal. Plural users with the same attribute belong to the principal when the same attribute is defined as belonging to the principal.

17 Claims, 5 Drawing Sheets

U.S. PATENT DOCUMENTS

| | | | |
|---|---|---|---|
| 2007/0162936 A1 | 7/2007 | Stallings et al. | |
| 2007/0240063 A1 | 10/2007 | Cheng et al. | |
| 2007/0282673 A1 | 12/2007 | Nagpal et al. | |
| 2008/0016232 A1* | 1/2008 | Yared et al. | 709/229 |
| 2008/0034314 A1 | 2/2008 | Louch et al. | |
| 2008/0215675 A1* | 9/2008 | Kaminitz et al. | 709/203 |
| 2008/0270929 A1 | 10/2008 | Bohn et al. | |
| 2009/0157728 A1 | 6/2009 | Fletcher et al. | |
| 2009/0205029 A1 | 8/2009 | Noda et al. | |
| 2009/0235285 A1 | 9/2009 | Kim et al. | |
| 2009/0265362 A1 | 10/2009 | Parsons et al. | |
| 2009/0313601 A1 | 12/2009 | Baird et al. | |
| 2009/0328137 A1 | 12/2009 | Liang et al. | |
| 2009/0328205 A1* | 12/2009 | Ims et al. | 726/22 |
| 2010/0034258 A1 | 2/2010 | Pandit et al. | |
| 2010/0042973 A1* | 2/2010 | Anderson et al. | 717/120 |
| 2010/0070925 A1 | 3/2010 | Einaudi et al. | |
| 2010/0082989 A1* | 4/2010 | Bussard et al. | 713/176 |
| 2010/0269149 A1* | 10/2010 | Lee et al. | 726/1 |

OTHER PUBLICATIONS

Tyler Close, "Web-key: Mashing with Permission," Hewlett-Packard Labs, (2008), presented on Apr. 21-25, 2008, Beijing, China, pp. 1-8.
"Design pattern in simple examples," Jul. 5, 2007, http://www.go4expert.com/forums/showthread.php?t=5127, pp. 1-53.
Office Action issued by the U.S. Patent Office on Dec. 22, 2011 in connection with related U.S. Appl. No. 12/763,798.
Office Action mailed by the U.S. Patent Office on Dec. 30, 2011 in connection with related U.S. Appl. No. 12,763,724.
Office Action issued by the U.S. Patent Office on Jan. 9, 2012 in connection with related U.S. Appl. No. 12/763,517.
Office Action issued by the U.S. Patent Office on Sep. 11, 2012 in connection with related U.S. Appl. No. 12/890,224.
Office Action issued by the U.S. Patent Office on Aug. 8, 2012 in connection with related U.S. Appl. No. 12/763,517.
Notice of Allowance issued by the U.S. Patent Office on Aug. 8, 2012 in connection with related U.S. Appl. No. 12/763,798.

* cited by examiner

METHOD AND APPARATUS TO APPLY AN ATTRIBUTE BASED DYNAMIC POLICY FOR MASHUP RESOURCES

CROSS-REFERENCE TO RELATED APPLICATIONS

This application claims the benefit of the following Provisional application: 61/171,376 filed Apr. 21, 2009, which is expressly incorporated herein by reference.

TECHNICAL FIELD

The technical field relates in general to computer networks, and more specifically to mashups and providing access control relating to mashups.

BACKGROUND

Mashups are known for obtaining live data from web services and providing the data to the user in a more flexible manner than conventional portals. Businesses today lack a straightforward way to apply fine-grained, attribute-based policy control to enterprise mashup-based applications.

Enterprise mashup solutions are created rapidly, are dynamic in nature, and can be easily shared with others, promoting collaboration. Given this context, straightforward and fine-grained access control is a must. Moreover, businesses require solutions that are as open and cross-platform as possible.

Previous attempts at solving this problem rely on non-enterprise mashup-based approaches.

Previous solutions that were fairly straightforward were also more coarse-grained in the policies that could be created and applied. On the other hand, previous solutions that supported more sophisticated policies were also more complicated to use.

SUMMARY

Accordingly, one or more embodiments provide a computer system. The computer system includes a processor. The processor is configured with a mashup section that provides a mashup that performs an action on a resource included in the mashup; an attribute identification section that identifies an attribute of a user running the mashup to perform the action on the resource; and an access control section providing an access control. The mashup is associated to a permission artifact, the permission artifact specifying a principal and whether one of to permit and to prohibit the principal to take the action on the resource. The access control is triggered only when the mashup attempts to perform the action on the resource. The access control (i) checks whether the attribute of the user running the mashup to perform the action is predefined as belonging to the principal specified in the permission artifact associated to the mashup, and then (ii) performs the one of to permit and to prohibit the action on the resource only when the attribute belongs to the principal. Plural users that have a same single attribute belong to the principal when the same single attribute is defined as belonging to the principal.

According to other aspects, changing whether the single attribute belongs to the principal thereby changes whether one of to permit and to prohibit the action on the resource for all of the plural users that have the same single attribute.

According to still further aspects, the permission artifact further specifies: (i) the resource used by the mashup, and (ii) the action on the resource for which permission is needed.

In still another aspect, the access control is separate from an authentication and an authorization passed through from the resource included in the mashup.

According to yet a further aspect, the mashup further comprising an extensible access control markup language (XACML) attribute-based artifact, the running of the mashup with the XACML attribute-based artifact results in a second access control.

In another aspect, there is a user interface configured to specify, in the permission artifact, the principal, the action, the resource, and that the principal is one of permitted and prohibited from taking the action on the resource.

Still another embodiment includes associating the user as an owner of the mashup, only the owner of the mashup being allowed to set and update the permission artifact for the mashup.

A further embodiment provides a computer-implemented method for providing a mashup as outlined above.

According to yet another embodiment, there is a non-transitory computer-readable medium having stored thereon instructions for execution by a computer. When executed, the instructions provide the method outlined above.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages.

DETAILED DESCRIPTION

In overview, the present disclosure concerns computer systems, sometimes referred to as client/server networks, such as may be associated with computer systems providing mashups. Such computer systems often involve running a mashup on a user's computer that provides a user interface on the user's computer and that communicates as a client with a mashup server that invokes the desired web service specified by the mashup, the web service providing live data through the mashup client/server, so that the live data can be used according to the mashup without regard to user interface formatting specified by the web service. More particularly, various inventive concepts and principles are embodied in systems, devices, and methods therein for establishing permissions for mashups and/or for providing a policy framework for mashup resources.

The computer systems of particular interest are those providing or facilitating mashups over computer networks involving a mashup server and a user's computer, and the like, and variants or evolutions thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to provide an enterprise mashup policy framework that has a dynamic, fine-grained access control to enterprise mashups and related artifacts. The enterprise mashup policy framework can use a combination of a permission-based with an attribute-based approach, which can be created at design time and/or at runtime and can support the creation of social groups, which can be dynamic, attribute-based groupings based on run time attributes.

The enterprise mashup policy framework may integrate with existing third-party and custom (home-grown) attribute provider systems and identity management solutions within an enterprise. Attributes from these external systems can be used to create dynamic policies for controlling access to enterprise mashups. Dynamic policy generation can be used to support dynamic resource groups and dynamic user groups.

This solution can be standards based and highly extensible.

This solution also may have an administration user interface for managing policies making it even easier and more understandable. The solution may include reusable and embeddable enterprise mashup based UI components that can be used as building blocks for integrating management features into enterprise mashup applications.

Further in accordance with exemplary embodiments, a combination of permission-based and attribute-based approaches can be used. A permission artifact can be a combination of a resource, an action, and a principal (a user, a group, a role) which is permitted or not.

A specific permission artifact can be paired with a generalized attribute-based approach. The permission artifact can capture the majority of the cases that are required for mashup. Accordingly, control can be a much more simplified format in comparison to available programmable permission controls, which can be applied more easily and quickly. The permission artifact can require specification of three items: the resource, an action on the resource for which permission is needed, and a principal that may or may not be permitted the action on the resource. The permission artifact asks, is the requested action on the resource allowed for the principal?

Attributes can be used to define other conditions which are user customizable. Because they are user customizable, they can be more complicated.

One point is that by using simple permissions in combination with segregated customizable attributes, 80-90% of policy requests are anticipated to be funneled through the permission-based part of the system that can be handled quickly. The potentially complex attributed-based policy also can be supported. The permissions policy thus can be simplified.

Extensible access control markup language (XACML) 2.0 is an example of a standard (expressly incorporated herein by reference) which can be used for the attribute-based approach. However, it will be appreciated that the XACML standard is not an easy-to-use approach. Consequently, the use of the permission-based approach is much more user-friendly.

The dashboard used for a mashup can participate in access management, e.g., in a large organization. For example, if an organization has an infrastructure for log-in, authentication and authorization, the dashboard can support the same control mechanisms. More particularly, the dashboard can use the permission-based and attribute-based feature to ask for authentication (e.g., password, sign-on solution, and the like) and authorization, where the authentication is through the specific permission artifact in the dashboard.

Also, integration of the specific permission artifact into the dashboard permits the creation of gigantic permissions or groupings of permissions which support the notions of social groups for sharing.

An administrative console, for example, as a Mashlet™ component, which can be embedded, can be reused and can generate the permissions discussed above. The administrative console can interact with the user to determine the resource, then determine which actions are appropriate for the resource, and then interact with the user to determine the principal. It then can generate the permission which is then included into the mashup.

Consequently, the mashup itself can provide permissions without merely passing through the permissions from the service included in the mashup.

Figure 1:
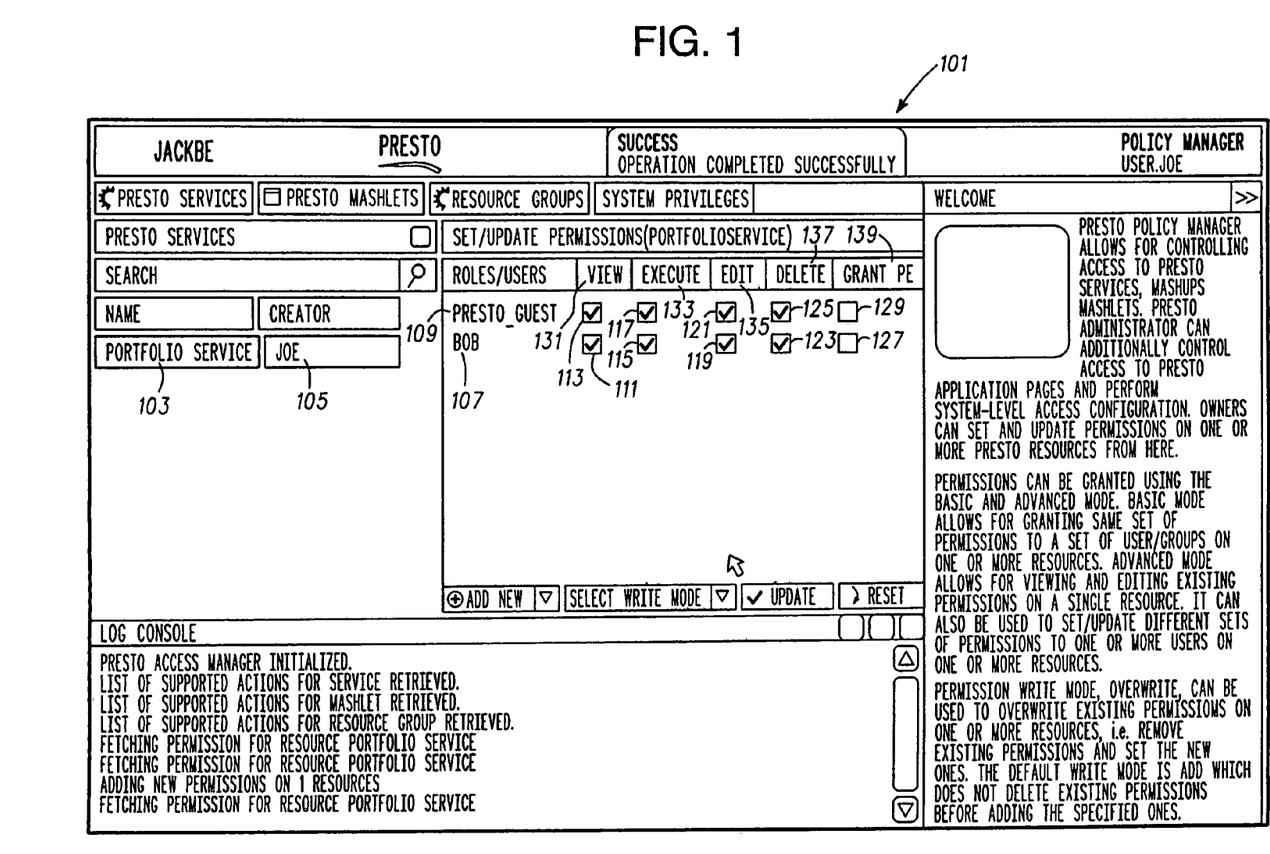
FIG. 1 is an illustration of an example user interface for setting up/updating permissions.

Referring now to FIG. 1, an illustration of an example user interface 101 for setting up/updating permissions will be discussed and described. FIG. 1 illustrates setting up/updating permissions to one or more principals on one or more resources (referred to especially in FIG. 1 as the "basic mode"). FIG. 1 also discusses an "advanced mode" allowing for viewing and editing permissions on a single resource, setting/updating different sets of permissions to one or more users on one or more resources.

The resource 103 in the example of FIG. 1 is a service named "Portfolio Service". Although only one service is illustrated, multiple services can be listed and one or more can be selected and assigned permissions as a group. The actions 131, 133, 135, 137, 139 in this example are view, execute, edit, delete, and grant permissions; the illustrated actions are representative of actions which can be taken on or taken to affect a resource. A combination of one or more of these and/or other actions can be provided. The principals 107, 109 in this example are "Presto_Guest" and "bob." Once the resource 103 (here, the service) is selected, the actions 131, 133, 135, 137, 139 can be selected 111, 113, 115, 117, 119, 121, 123, 125 or deselected 127, 129 for each of the principals 107, 109.

The policy manager can allow for controlling access to resources 103 such as services accessed via a mashup (as described above), mashlets, mashups, and mashup components. The policy manager also can control access to other resources such as application pages (e.g., tabs) and system-level access configuration. Owners of mashups can set and update permissions on one or more resources from a page such as the user interface illustrated 101 in FIG. 1.

Permissions can be granted using the basic mode and/or advanced mode. Basic mode can allow for granting the same set of permissions to a set of users/groups 107, 109 on one or more resources 103. The generalized attribute-based approach (also referred to especially in FIG. 1 as the "advanced mode") allows for viewing and editing existing permissions on a single resource. It can also be used to set/update different sets of permissions 131, 133, 135, 137, 139 to one or more users 107, 109 on one or more resources 103.

Permissions write mode ("overwrite") can be used to overwrite existing permissions on one or more resources, that is, to remove existing permissions and set new permissions. A default write mode can be provided such as "Add" which does not delete existing permissions before adding the specified ones.

Resource Types and Actions

A combination of one or more of the following resource types and actions can be supported. It will be appreciated that supported actions can vary as appropriate from resource type to type:

Service: View, Execute, Edit, Delete, Grant permissions
Mashlet: View, Config, Edit, Delete, Grant permissions
Resource Group View, Create, Config, Edit, Delete, Grant permissions A resource group (RG) can be a composite resource (see, e.g., Shabbir, "Composite" in "Design pattern in simple examples" available on the forums on go4expert.com). An RG can be defined by specifying a filter or Boolean predicate function expressed in XACML against a Resource attribute domain. All resources for which a filter returns true are consider to be part of (e.g., member of) RG.

There can be two sets of permissions defined for each of RG:

(1) RG Members Permission Set. There are permissions which can be applicable for every member of RG.

(2) RG Entity Permission Set. This is permission for RG entity itself This permission set can be used to control who can view, modify RG itself as well as who can modify Members Permission Set.

Out of the box following RG can be defined:
AllServices
AllMashlets
AllResourceGroups The above RGs can be groups of all Resources of respective types. For example, AllServices can be an RG which contains all services. A utility for All* RGs above can be provided to control who can create a Resource of a given type, such as who can create a Service. However, these RGs can also be used to control other available actions such as VIEW, MODIFY, and the like.

Dynamic User Groups

A Dynamic User Group (PDUG) or "Social Group" can be a composite principal which can be used to define permissions and policies instead of using individual users as principals.

A PDUG can be defined by specifying a filter or Boolean predicate function expressed in language similar to SQL where clause against User attribute domain. For example, one might create a "jackBeUsers" Group by specifying a filter:
email like '%jackbe.com'

An out of the box only admin can create a PDUG, for example. An admin can grant PDUG creation to any other user or group of users. A system can provide so that, as with other Resources, when a user creates a resource only that user (owner, creator) can see the PDUG and reference it in Permissions. It will be appreciated that a user may wish to take care when modifying an existing PDUG filter, when a PDUG is visible to a wide group of people and potentially used in many Permissions. As a practical matter, a PDUG filter can be modified in a handful of scenarios:

1. PDUG was just created and a typo/mistake was made in the filter

2. No permission was granted for others to see the PDUG, and thus it can be seen/used only by the owner and the owner well knows what permissions this PDUG is using.

User Interface Support

Figure 2:
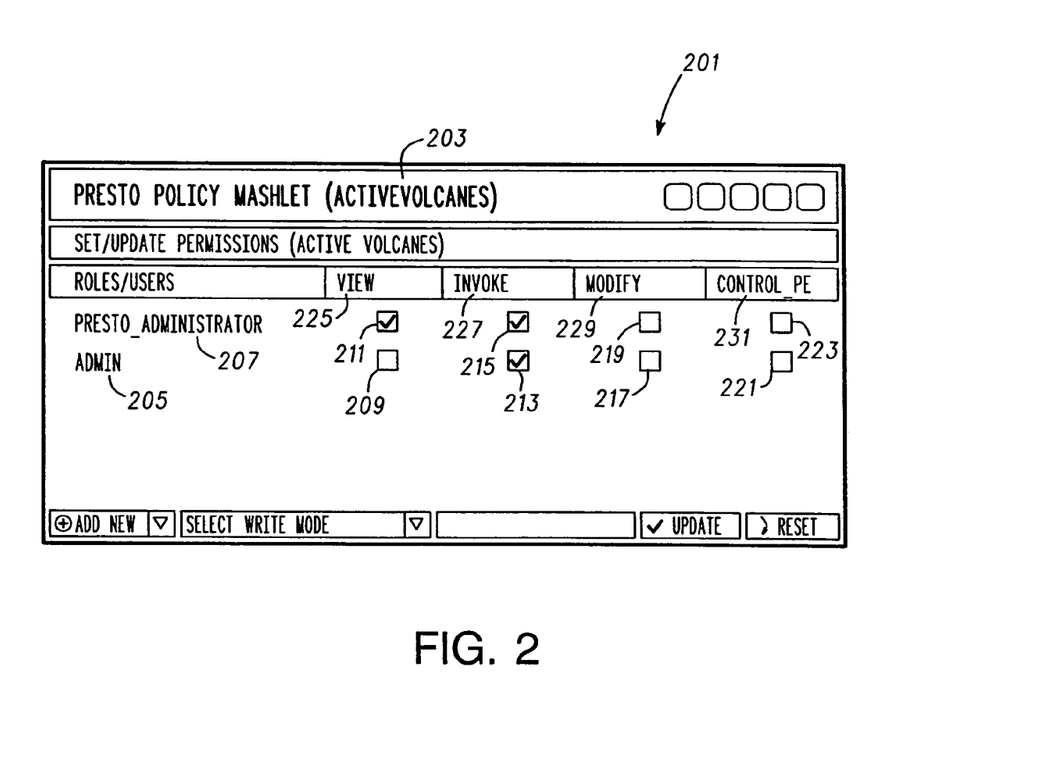
FIG. 2 is an illustration of a simplified version of the user interface of FIG. 1.

A policy framework can include a user interface (UI) component, in this example, two major UI components: policy manager (e.g., FIG. 1) and policy mashlet (e.g., FIG. 2). A policy manager can allow for setting permissions on services, mashlets, resource groups, and also to perform various administrative operations. A policy mashlet can provide a reusable component for setting permissions on a given resource. In addition, "permission panels" can be available reusable EXT-based panels that can be embedded in other EXT applications.

Policy Manager

A policy manager can be provided (such as illustrated in FIG. 1), in which a user can perform the following:

(1) Grant permissions, e.g., on the following types of resources. A user can grant on one or more services. A bulk operation can support making it easy to control access on several services. A user can also choose to overwrite permissions with a new set of permissions using an 'overwrite' mode:

Mashables (services, mashups)
Mashlets
Resources Groups which are collections of mashables (2) Manage resource groups. That is, to create, edit, and/or delete a resource group using attribute-based filters and to assign permission on resource group entities.

(3) Manage permissions on UI Objects. UI Objects can be system resources, such as PRESTO (brand) system resources, e.g., Service Explorer, Wires, Policy Manager, and/or custom UI objects such as a mashlet and/or a custom UI.

(4) Manage dynamic groups.

(5) Setup system privileges, such as "Service Publisher" and assign who has permissions to publish the services.

Referring now to FIG. 2, an illustration of a simplified version of the user interface of FIG. 1 will be discussed and described. Here, a user interface 201 is a permissions mashlet that can be used to set permissions on a resource. This mashlet can take in a resource identifier and type 203 as input parameters, and can display all available permissions 225, 227, 229, 231 as well as identifiers for principals 205, 207, with support for adding/updating/deleting permissions.

Once the resource 203 (here, the service ActiveVolcanoes) is selected, the actions 225, 227, 229, 231 (e.g., view, invoke, modify, control permissions) can be selected 211, 213, 215 or deselected 209, 217, 219, 221, 223 for each of the principals 205, 207.

The system can provide a permissions mashlet such as in FIG. 2 which, out of the box, can be used to set permissions on any resource. The mashlet can take in the resource ID and type as input parameters and can display all available permissions with support for adding/updating and/or deleting permissions. Generally, conventional techniques are known for preparing mashlets.

Figure 3:
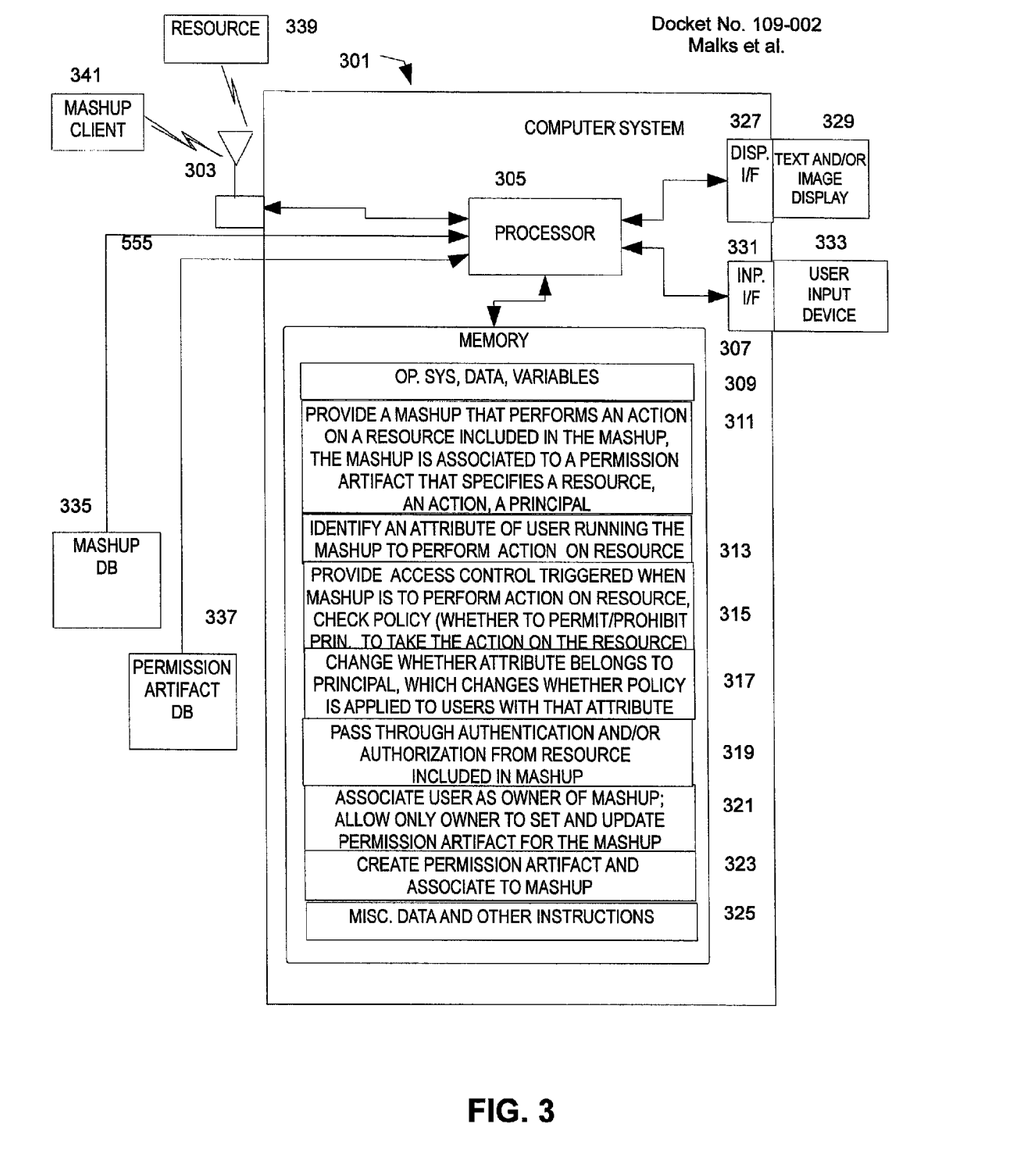
FIG. 3 is a block diagram illustrating portions of an exemplary computer system for a mashup policy framework.

Referring now to FIG. 3, a block diagram illustrating portions of an exemplary computer system for a mashup policy framework will be discussed and described. The computer system 301 may include a communication port and/or transceiver 303 or the like for communication with a mashup client 341, a processor 305, a memory 307, an optional display interface 327 and a display 329, an optional input interface 331 and a user input device 333 such as a keyboard.

The processor 305 may comprise one or more microprocessors and/or one or more digital signal processors. The memory 307 may be coupled to the processor 305 and may comprise a read-only memory (ROM), a random-access memory (RAM), a programmable ROM (PROM), and/or an electrically erasable read-only memory (EEPROM). The memory 307 may include multiple memory locations for storing, among other things, an operating system, data and variables 309 for programs executed by the processor 305; computer programs for causing the processor to operate in connection with various functions such as providing 311 a mashup associated to an artifact, identifying 313 an attribute of a user running the mashup, providing 315 access control triggered when the mashup is to perform an action on the resource, changing 317 whether the attribute belongs to the principal, passing through 319 authentication and/or authorization from the resource in the mashup, associating 321 the user as the owner of the mashup, and creating 323 the permission artifact, and/or other processing; and a database 325 for other information used by the processor 305. The computer programs may be stored, for example, in ROM or PROM and may direct the processor 305 in controlling the operation of the computer system 301.

The user may invoke functions accessible through the user input device 333, interfaced with the processor 305 through an input interface 331. The user input device 333 may comprise one or more of various known input devices, such as a keyboard and/or a pointing device, such as a mouse; the keyboard may be supplemented or replaced with a scanner, card reader, or other data input device; the pointing device may be a mouse, touch pad control device, track ball device, or any other type of pointing device; and the input interface 331 can be a known interface thereof to communicate with the processor 305.

The text and/or image display 329 is representative of a display that may present information to the user by way of a conventional liquid crystal display (LCD) or other visual display, and/or by way of a conventional audible device for playing out audible messages.

Responsive to signaling from the user input device 333, in accordance with instructions stored in memory 307, or automatically upon receipt of certain information via the communication port and/or transceiver 303, the processor 305 may direct the execution of the stored programs.

The mashup client 341 can be a part of a mashup platform comprising the computer system 301 acting as a mashup server which can execute on the processor 305 and the mashup client 341, according to known techniques. Mashup server and mashup client functions can be distributed to the mashup server 301 and/or the mashup client 341, as will be appreciated by one of skill in this field. Accordingly, the user may invoke functions through a user input device on the mashup client 341, and information may be presented to the user through a display on the mashup client 341. Details which are not presently relevant are omitted from the present description.

The mashup server 301 can invoke services (represented here by remote resource 339) such as web services and the like, according to known techniques.

The mashup server 327 can access a mashup database 335 on which mashups can be stored (according to known techniques), and a permission artifact database 337 on which permission artifacts can be stored as further described herein. The permission artifact database 337 can list each of the permissions which are defined for each of the mashups. Although the present example illustrates separate databases for the permission artifacts and the mashups, the permission artifact can be stored with the mashup to which it is associated. Wherever the mashup resides, it can be configured to check for whether it has an associated permissions artifact, and to check whether the principal running the mashup has the permission to take the action they request. The mashup server also can store attributes associated to the mashups.

The processor 305 can be programmed for providing 311 a mashup associated to an artifact; the mashup performs an action on a resource included in the mashup; the permission artifact specifies a resource, an action, and a principal. The mashup can be provided according to known techniques when a user invokes a service or a mashup. As is known, the invocation of the mashup can be performed via the mashup platform which comprises the mashup client 341 and the mashup server 301, sometimes requiring the system to display information to a user and/or to interact with the user to input data via the user input device 333 and/or display 329 on the computer system 301 or the mashup client 341. The mashup can perform an action on a resource included in the mashup, as discussed above. The mashup can be associated to a permission artifact, for example stored in the permission artifact database 337. A mashup can be associated to one or more permission artifacts. Since a mashup which is associated to one permission artifact can invoke one or more other mashups (which can have different permission artifacts) as a resource, permissions can be layered. The permission artifact can be retrieved, e.g., by using the mashup identifier or other resource identifier as a key.

The permission artifact stored in the permission artifact database 337 can specify a resource, an action, and a principal that require permission. The principal specified in a permission artifact can be an individual, or can refer generically to a class of individuals which are linked by having the same attribute. Actions are discussed elsewhere in details. Examples of principals and resources are provided below.

As an example of a principal, consider developers. Developers (as a group of principals) are defined to be able edit, delete, etc., the mashup. That a user is considered to be in the principal "developers" is based on the pre-defined attribute values of the user. This is to be distinguished from the conventional situation that an administrator created a group called "developers" and listed specific people in order to add them to the group. In this case, "developers" is defined as a group of principals. The individual users are then classified based on the attribute values of the users. Anybody who has a pre-defined attribute value which is predefined as belong to the group is part of the developers group. For example, anyone with the attribute value of abcdev.com is pre-defined to be one of the "developers," i.e., the user is identified by an e-mail address (attribute field) which has the pre-defined attribute value "abcdev.com'. The definition of the attribute (field and values) of individuals which belong to the group of "developers" can be changed by the administrator, for example, by adding e-mail address of "xyzdev.com" to the principal "developers." The permission is associated with the principal (and thus the individuals that belong in the principal), and consequently the system can easily define who is associated with the principal merely by the attribute without having to re-define the permission and without having to list the individuals.

A mashup is just one example of a resource. Other resources that can be managed with attribute-based permissions include: mashable services, web-based service such as WSDL, REST service, Excel Service, an XML artifact in an HTML page, and the like. The system can also provide attribute-based definitions for resources, so as to define permissions of these services. A combination of one or more of these services is what can be created as a mashup. E.g., an XACML attribute-based artifact in a mashup, according to XACML 2.0, XACML 3.0, variations and evolutions thereof.

The processor 305 can be programmed for identifying 313 an attribute of a user running the mashup to perform an action on the resource. Attributes of principals can include, for example, e-mail that is from or to a certain website, title, pay scale, address, and/or any other attribute directly associated with a user that can be looked up from the user's name or handle. Typically, the attribute information can be obtained from a directory service, for example, an LDAP (L directory and access provisioning) service using the user's handle or user's name (if known), according to known techniques.

The processor 305 can be programmed for providing 315 access control triggered when the mashup is to perform an action on the resource, so as to check a policy (e.g., whether to permit/prohibit the principal to take the action on the resource). The access control defined by the permission artifact need not be performed until the action is initiated on the resource. For example, if the mashup itself is the resource associated to the permission artifact, then when the user initially attempts to run the mashup the access control is triggered immediate, and the system can check whether the user has an attribute for the principal defined in the permission artifact, and whether the principal (and hence the user) is permitted/prohibited to take the requested action. As another example, assume that the mashup (associated to a permission artifact) executes a service when requested by a user, and the permission artifact specifies the service as the resource, "execute" as the action, and that principal "P" is prohibited (as the principal". The access control can be triggered when the user interacts with the mashup to initiate the service; if the user has an attribute identified as belonging to P then the user is then expressly prohibited to "execute" the service.

The processor 305 can be programmed for changing 317 whether the attribute belongs to the principal, which changes whether the policy is applied to users that have that attribute. For example, a menu can be provided which identifies a principal, and the attribute (attribute field and attribute value) that belongs to the principal. Any of the attributes which can be retrieved by the directory services as an attribute can be used. Typical examples of LDAP attribute fields include communication attributes (such as mail address, postal address, country name, locality name, building name, organization name, organizational unit name, department number, title, owner, uniqueIdentifier (e.g., payroll code, department code), organizationalStatus, employeeType, secretary, manager, and the like. Conventionally, an administrator User Interface needs to list individual users in order for them to be added to the group. In contrast, the present system can add the attribute to the principal, which automatically without more causes all users with that attribute to belong to the principal. For example, specifying that "country name" with a value of "Canada" is added to a principal automatically causes all users in the directory that have the country name of Canada to belong to that principal, without identifying the users; similarly, updating the principal to omit "country name" of "Canada" automatically omits all users with the country name of Canada. Moreover, a user is automatically included in or excluded from the principal when the user's country name in the directory is revised to add or omit "Canada".

The processor 305 can be programmed for passing through 319 authentication and/or authorization from the resource which is invoked, called or used in the mashup. For example, some services themselves may require a user ID and/or password (as a type of authentication) and/or a security certificate (as a type of authorization). These are simply passed through the mashup as usual. A permission artifact as discussed herein is another type of authorization.

The processor 305 can be programmed for associating 321 the user as the owner of the mashup. The user that is associated as the owner of the mashup is the only user allowed to set and update the permission artifact(s) for the mashup which it owns.

The processor 305 can be programmed for creating 323 the permission artifact and associating the permission artifact to the mashup. A user interface can prompt a user to indicate a resource, one or more principals, and one or more permissions for each of the principals. It is appropriate to have different types of permissions for different types of resources, e.g., read, write, delete, manage, and the like, as discussed elsewhere. The permissions can be binary, e.g., toggled to indicate permit/prohibit; or the permissions can be n-ary, e.g., selected to expressly permit (wherein a principal not permitted is prohibited) and expressly prohibit (wherein a principal not expressly prohibited is permitted). When the user interface has a fully defined permission artifact (e.g., resource, principal, permission), the permission artifact can be associated to the mashup. The mashup can be the resource, or the user interface can prompt the user to indicate a mashup that calls the resource which is to be associated to the permission artifact. Optionally, the permission artifact can be associated to a resource; a resource invoked by mashup is identified by the mashup server (e.g., computer system 301) in accordance with known techniques. The permission artifact which is associated to a mashup (or resource) can be stored in a permission artifact database 337. The permission artifact can be retrieved from the database by its resource ID or permission ID which is normally used by the mashup server.

These permission artifacts can be stored in the mashup server. The user can be authenticated (if normally required), and then the permission artifact can be triggered and checked. When the user tries to take an action in connection with the mashup, the permission artifact can be retrieved from the permission artifact database by the mashup server to check whether the action is permitted. The user can run a mashup in the conventional way. Using traditional techniques, the user can authenticate to the server that has the mashup. The mashup can have a permission artifact in it; the mashup is basically a script and the user is typically not aware that the mashup has a permission artifact. So, for example, when user ID Joe tries to manage a mashup, the mashup server can determine that Joe has a user id joe@xyz.com, xyz.com is pre-defined as belong to the principal "developer's group", and hence Joe belongs to the developer's group (principal). Since all developers have "manage" permission on this mashup, Joe is permitted to manage that mashup.

The computer system 301 can include a central processing unit (CPU) with disk drives (not illustrated), symbolic of a number of disk drives that might be accommodated by the computer. Typically, these might be one or more of the following: a floppy disk drive, a hard disk drive, and a CD ROM or digital video disk. The number and type of drives may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external.

It should be understood that FIG. 3 is described in connection with logical groupings of functions or resources. One or more of these logical groupings may be omitted from one or more embodiments. Likewise, functions may be grouped differently, combined, or augmented without parting from the scope. For example, the mashup client 341 and the computer system 301 can collectively provide 311 the mashup to a user on the mashup client 341. Similarly the present description may describe various databases or collections of data and information. One or more groupings of the data or information may be omitted, distributed, combined, or augmented, or provided locally and/or remotely without departing from the scope of the invention.

Figure 4:
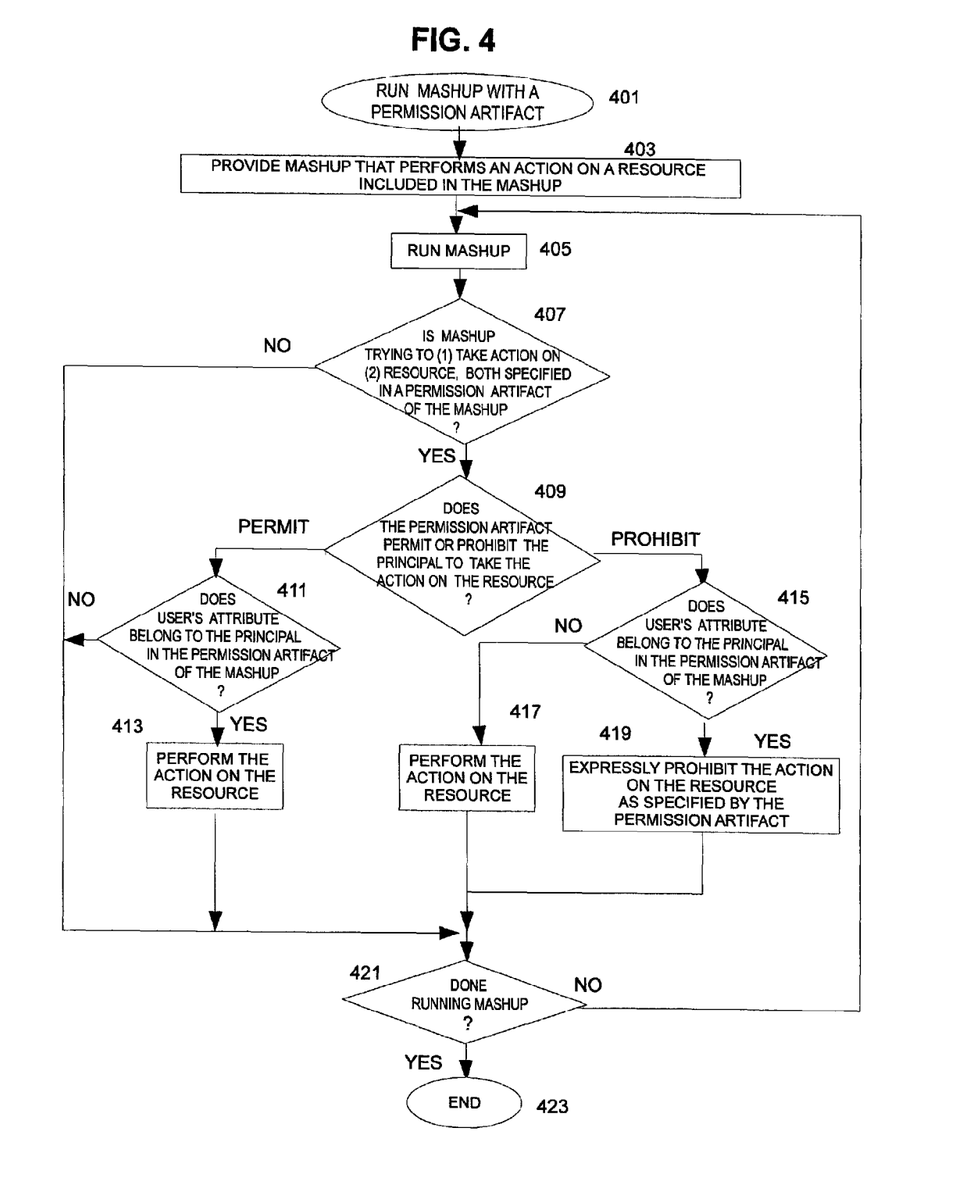
FIG. 4 is a flow chart illustrating a procedure to run a mashup with a permission artifact.
Figure 5:
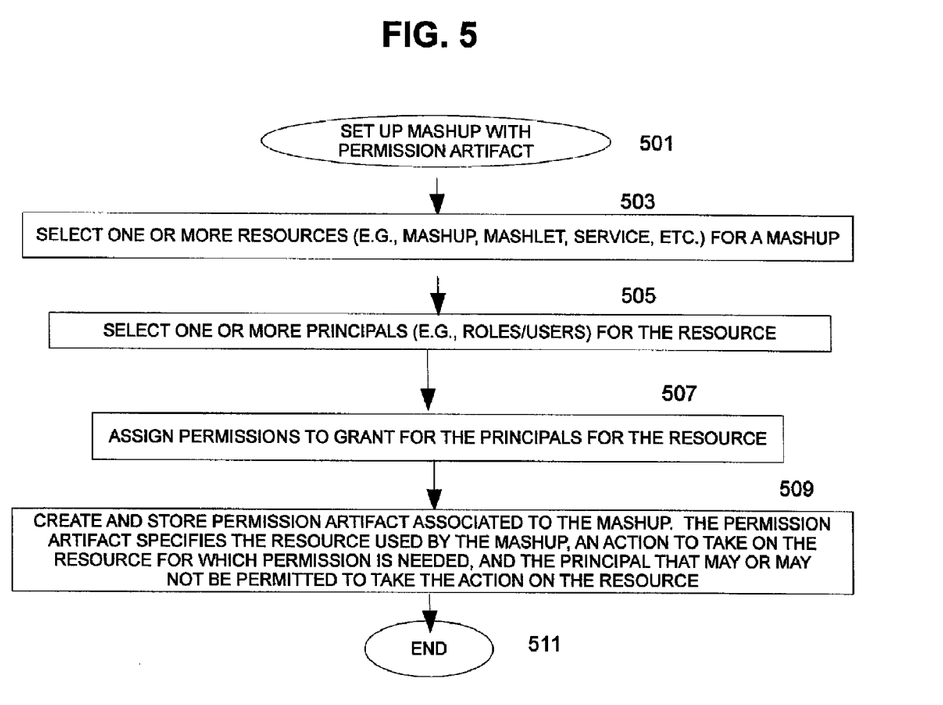
FIG. 5 is a flow chart illustrating a procedure to set up a permission artifact.

FIG. 4 and FIG. 5 are discussed below with regard to procedures to run a mashup with a permission artifact, and to set up a permission artifact. The procedures of FIG. 4 and FIG. 5 can advantageously be implemented on, for example, a processor of a computer system described in connection with FIG. 3 or other apparatus appropriately arranged.

Referring now to FIG. 4, a flow chart illustrating a procedure 401 to run a mashup with a permission artifact will be discussed and described. In overview, the system can evaluate the permission artifact. The system knows who the user is (e.g., from authentication), checks whether the user belongs to the principal, and checks whether the principal is permitted to perform the action on the resource. The resource (e.g., mashup) may be attribute-based also. If the user is not permitted to perform the action on the resource, an error message can be sent to the user. These are discussed below, however, details which are discussed above may be omitted from the following discussion.

The procedure 401 can provide 403 a mashup that performs an action on a resource included in the mashup. Known techniques may be utilized to provide the mashup.

The procedure 401 can support running 405 the mashup according to known techniques.

The procedure 401 can determine 407 whether the mashup is trying to (1) take action on (2) a resource, where both the action and the resource are specified in a permission artifact associated to the mashup. If the mashup is not trying to take the permission-artifact-specified action on the specified resource, then the procedure 401 continues on.

However, if the action and resource are controlled by a policy (as indicated by a permission artifact), then the procedure 401 can check 409 whether the action on the resource is permitted or prohibited for the principal. If the action on the resource is permitted for the principal, then the procedure 401 can check 411 whether the user's attribute belongs to the principal in the permission artifact of the mashup. For example, the user's attribute value can be requested and obtained from a directory service and judged whether the attribute value is the same as that specified for the principal in the permission artifact. If so, then the procedure 401 can perform 413 the action on the resource. Otherwise, the procedure 401 can skip the action.

On the other hand, if the action on the resource is expressly prohibited for the principal, then the procedure 401 can check 415 whether the user's attribute belongs to the principal in the permission artifact of the mashup. If so, then the procedure 401 can expressly prohibit 419 the action on the resource. Otherwise, the procedure 401 can perform 417 the action on the resource. It will be appreciated that straightforward binary permissions procedure can omit flow 409, 415, 417 and 419.

If 421 the mashup loops and is not done, then the procedure 401 can repeat. Otherwise the procedure can end 423.

Referring now to FIG. 5, a flow chart illustrating a procedure 501 to set up a permission artifact will be discussed and described. In order to set up a permission artifact, a user can interact with the system. For example, an administrator can interact with the system to define attribute-based groupings of principals and/or attribute-based groupings of resources, and defines which resource group has which permissions for which principals. The collected group of principals, resources, and permissions defines a policy framework. These are discussed below, however, details which are discussed above may be omitted from the following discussion.

The procedure 501 can select 503 one or more resources (such as a mashup, mashlet, service or the like) for a mashup. This can be done, for example, by interacting with a user.

The procedure 501 can select 505 one or more principals (such as individual users or roles) for the resource, again by interacting with the user.

The procedure 501 can assign 507 permissions to grant which the principals make take for the resource which has been selected, again by interacting with the user.

The procedure 501 can create a permission artifact indicating the selected resource, principal, and actions which they may take with respect to the resource; and the permission artifact may be stored as being associated to the specific mashup.

It will be appreciated that the permission artifact may be modified or deleted, also.

Definitions

"Associated to" as the term is used herein means that an administrator has defined the permission artifact to include the mashup (as the resource). The association can be very dynamic.

The term "attribute" as used herein refers to a value returned for an LDAP attribute in accordance with the X.500 LDAP specification, LDAP v2, LDAPv3 (Internet Engineering Task Force (IETF) Standard Track Requests for Comments (RFCs) as detailed in RFC 4510); a value from a Microsoft brand OutLook Address Book entry; a value returned from Microsoft Active Directory Services Interface; and adaptations, evolutions and variations thereof. In a typical LDAP entry, for example, such as "givenName: John", "givenName" is the attribute name and the value "John" is the attribute. The term "user attribute" as used herein refers to an attribute which is returned for a particular user.

"Authentication" as used herein refers to a known technique for checking a combination of user ID and password.

"Authorization" is used to generally refer to determining whether there is permission for the action the user is trying to take. Authorization can use the permission artifact to see whether the user can take particular action. Alternatively, authorization can use conventional authorization techniques.

It should be noted that the term "computer system" used herein denotes a device sometimes referred to as a computer, laptop, personal computer, personal digital assistants, personal assignment pads, or equivalents thereof provided such units are arranged and constructed for operation with a mashup or service.

The term "mashup" as used herein is defined to be a software application that combines pre-existing components from one or more information-providing services into a single tool which can comprise a server-side and a client-side application, where the components used by the mash-up are visually presented to a user on a display at the client-side in a manner which is different from the pre-determined presentation of the information-providing service; the term "component" as used herein refers to data which is retrieved in real-time from an information-providing service. A mashup is frequently made by access to open APIs and other data sources to produce results that were not the original reason for producing the raw source data. An example of a mashup is the use of cartographic data from Google Maps to add location information to real estate data, thereby creating a new and distinct Web service that was not originally provided by either source. A "mashup", as the term is used herein, is expressly defined as being configured in accordance with mashup standards such as XML interchanged as REST (REpresentational State Transfer) or Web Services, RSS, Atom, and other evolutions and variations of mashup standards, or extracting data from a screen display output of a program on another site; but excluding simply linking to another site, such as through an HTML href. A mashup is to be distinguished from a portal in which content is presented side-by-side in the manner that is the same as the pre-determined presentation of the information-providing service.

The term "mashlet" used herein refers to a mashup that is a client side process that runs in the browser.

The term "Principal" used herein can be a particular individual user or a named group, such as identified by role.

The term "service" is used herein expressly to refer to an information-providing service that provides data from a server in a visual presentation on a display to a user, typically an application programming interface (API) or web API that can be accessed over a computer network and executed on a remote system hosting the requested services, in accordance with Extensible Markup Language messages that follow the Simple Object Access Protocol (SOAP) standard, Web Services Description Language (WDSL), Representational State Transfer (REST) constraints, and variations and evolutions thereof. An example of a service is Google Maps, a Web service or an RSS feed.

Furthermore, the computer networks of interest include those that transmit information in packets, for example, those known as packet switching networks that transmit data in the form of packets, where messages can be packetized and routed over network infrastructure devices to a destination. Such networks include, by way of example, the Internet, intranets, local area networks (LAN), wireless LANs (WLAN), wide area networks (WAN), and others, and can be supported by networking protocols such as TCP/IP (Transmission Control Protocol/Internet Protocol) and UDP/UP (Universal Datagram Protocol/Universal Protocol) and/or other protocol structures, and variants and evolutions thereof. Such networks can provide wireless communications capability and/or utilize wireline connections such as cable and/or a connector, or similar.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the computer system may be a general purpose computer, or a specially programmed special purpose computer. It may be implemented as a distributed computer system rather than a single computer. Similarly, a communications link may be World Wide Web, a modem over a POTS line, and/or any other method of communicating between computers and/or users. Moreover, the processing could be controlled by a software program on one or more computer system or processors, or could even be partially or wholly implemented in hardware.

One or more displays for the system may be provided in connection with HTML display format. Although HTML is the preferred display format, it is possible to utilize alternative display formats for interacting with a user and obtaining user instructions.

The above discussion has involved particular examples. However, the principles apply equally to other examples and/or realizations. Naturally, the relevant data may differ, as appropriate.

Further, the above has been discussed in certain examples as if it is made available by a provider to a single user with a single site. The above described system, device and/or method may be used by numerous users over distributed systems, if preferred.

The above has been described in connection with example data formats, for example XML and/or proprietary or public formats. However, it may be used in connection with other data formats, structured and/or unstructured, unitary and/or distributed.

The system used herein may rely on the integration of various components including, as appropriate and/or if desired, hardware and software servers, applications software, database engines, server area networks, firewall and SSL security, production back-up systems, and/or applications interface software. The configuration may be, preferably, network-based and optionally utilizes the Internet as an exemplary primary interface with the user.

The various databases may be in, for example, a relational database format, but other standard data formats may also be used.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated.

All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
a processor configured with:
    a mashup section that provides a mashup that performs an action on a resource included in the mashup;
    an attribute identification section that identifies an attribute of a user running the mashup to perform the action on the resource; and
    an access control section providing an access control,
    the mashup being associated to a permission artifact, the permission artifact specifying a principal and whether one of to permit and to prohibit the principal to take the action on the resource,
    wherein
        the access control is triggered only when the mashup attempts to perform the action on the resource,
        the access control (i) checks whether the attribute of the user running the mashup to perform the action is predefined as belonging to the principal specified in the permission artifact associated to the mashup, and then (ii) performs the one of to permit and to prohibit the action on the resource only when the attribute belongs to the principal,
        plural users that have a same single attribute belong to the principal when the same single attribute is defined as belonging to the principal, and
        the permission artifact further specifies: (i) the resource used by the mashup and (ii) the action on the resource for which permission is needed.

2. The computer system of claim 1, further comprising:
changing whether the single attribute belongs to the principal, thereby changing whether one of to permit and to prohibit the action on the resource for all of the plural users that have the same single attribute.

3. The computer system of claim 1, the access control being separate from an authentication and an authorization passed through from the resource included in the mashup.

4. The computer system of claim 1, the mashup further comprising an extensible access control markup language (XACML) attribute-based artifact, the running of the mashup with the XACML attribute-based artifact results in a second access control.

5. The computer system of claim 1, further comprising
a user interface configured to specify, in the permission artifact, the principal, the action, the resource, and that the principal is one of permitted and prohibited from taking the action on the resource.

6. The computer system of claim 1, further comprising associating the user as an owner of the mashup, only the owner of the mashup being allowed to set and update the permission artifact for the mashup.

7. A computer-implemented method for providing a mashup, comprising:
providing, in a processor, a mashup that performs an action on a resource included in the mashup;
identifying an attribute of a user running the mashup to perform the action on the resource; and
providing an access control,
    the mashup being associated to a permission artifact, the permission artifact specifying a principal and whether one of to permit and to prohibit the principal to take the action on the resource,
    wherein
        the access control is triggered only when the mashup attempts to perform the action on the resource,
        the access control (i) checks whether the attribute of the user running the mashup to perform the action is predefined as belonging to the principal specified in the permission artifact associated to the mashup, and then (ii) performs the one of to permit and to prohibit the action on the
resource only when the attribute belongs to the principal,
    plural users that have a same single attribute belong to the principal when the same single attribute is defined as belonging to the principal, and
the permission artifact further specifies: (i) the resource used by the mashup, and (ii) the action on the resource for which permission is needed.

8. The method of claim 7, further comprising:
changing whether the single attribute belongs to the principal, thereby changing whether one of to permit and to prohibit the action on the resource for all of the plural users that have the same single attribute.

9. The method of claim 7, the access control being separate from an authentication and an authorization passed through from the resource included in the mashup.

10. The method of claim 7, the mashup further comprising an extensible access control markup language (XACML) attribute-based artifact, the running of the mashup with the XACML attribute-based artifact results in a second access control.

11. The method of claim 7, further comprising
specifying, via a user interface, in the permission artifact, the principal, the action, the resource, and that the principal is one of permitted and prohibited from taking the action on the resource.

12. The method of claim 7, further comprising associating the user as an owner of the mashup, only the owner of the mashup being allowed to set and update the permission artifact for the mashup.

13. A non-transitory computer-readable medium comprising instructions for execution by a computer, the instructions including a computer-implemented method for providing a mashup, the instructions for implementing:
providing a mashup that performs an action on a resource included in the mashup;
identifying an attribute of a user running the mashup to perform the action on the resource; and
providing an access control,
    the mashup being associated to a permission artifact, the permission artifact specifying a principal and whether one of to permit and to prohibit the principal to take the action on the resource,
    wherein
        the access control is triggered only when the mashup attempts to perform the action on the resource,
        the access control (i) checks whether the attribute of the user running the mashup to perform the action is predefined as belonging to the principal specified in the permission artifact associated to the mashup, and then (ii) performs the one of to permit and to prohibit the action on the resource only when the attribute belongs to the principal, plural users that have a same single attribute belong to the principal when the same single attribute is defined as belonging to the principal, and the permission artifact further specifies: (i) the resource used by the mashup, and (ii) the action on the resource for which permission is needed.

14. The computer-readable medium of claim 13, further comprising:

changing whether the single attribute belongs to the principal, thereby changing whether one of to permit and to prohibit the action on the resource for all of the plural users that have the same single attribute.

15. The computer-readable medium of claim 13, the mashup further comprising an extensible access control markup language (XACML) attribute-based artifact, the running of the mashup with the XACML attribute-based artifact results in a second access control.

16. The computer-readable medium of claim 13, further comprising specifying, via a user interface, in the permission artifact, the principal, the action, the resource, and that the principal is one of permitted and prohibited from taking the action on the resource.

17. The computer-readable medium of claim 13, further comprising associating the user as an owner of the mashup, only the owner of the mashup being allowed to set and update the permission artifact for the mashup.

* * * * *